(12) United States Patent
Kattil Cherian et al.

(10) Patent No.: US 9,239,878 B2
(45) Date of Patent: Jan. 19, 2016

(54) INTERACTIVITY ANALYSES OF WEB RESOURCES BASED ON RELOAD EVENTS

(71) Applicant: Amazon Technologies, Inc., Reno, NV (US)

(72) Inventors: George Kattil Cherian, Bellevue, WA (US); Andrew Thomas Root, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 430 days.

(21) Appl. No.: 13/720,138

(22) Filed: Dec. 19, 2012

(65) Prior Publication Data
US 2014/0173415 A1    Jun. 19, 2014

(51) Int. Cl.
G06F 3/00       (2006.01)
G06F 15/173     (2006.01)
G06F 17/30      (2006.01)
G06F 9/54       (2006.01)
H04L 12/24      (2006.01)

(52) U.S. Cl.
CPC ............ *G06F 17/30861* (2013.01); *G06F 9/54* (2013.01); *H04L 41/50* (2013.01)

(58) Field of Classification Search
CPC ............ G06F 9/542; G06F 9/54; H04L 41/50
USPC .......................................... 719/310; 709/223
See application file for complete search history.

(56) References Cited

U.S. PATENT DOCUMENTS

| | | | |
|---|---|---|---|
| 7,685,514 B1 | 3/2010 | Khatwani et al. | |
| 8,073,947 B1 * | 12/2011 | Yeh et al. | 709/224 |
| 2001/0016840 A1 * | 8/2001 | Hijikata et al. | 707/1 |
| 2002/0107890 A1 | 8/2002 | Gao | |
| 2005/0108418 A1 | 5/2005 | Bedi et al. | |
| 2008/0229025 A1 * | 9/2008 | Plamondon | 711/126 |
| 2009/0094522 A1 | 4/2009 | Tu et al. | |
| 2009/0319355 A1 * | 12/2009 | Sinyagin et al. | 705/14.25 |
| 2011/0302235 A1 * | 12/2011 | Monk et al. | 709/203 |
| 2014/0059663 A1 * | 2/2014 | Rajshekar et al. | 726/6 |

OTHER PUBLICATIONS

KyoungSoo, Securing Web Service by Automatic Robot Detection, 2006.*
International Search Report and Written Opinion for PCT Application No. PCT/US2013/076033 dated Apr. 29, 2014.

* cited by examiner

*Primary Examiner* — Lechi Truong
(74) *Attorney, Agent, or Firm* — Athorus, PLLC

(57) ABSTRACT

The initiation of a reload event by a user of a client-side application who requests a web resource from a server is an implicit indication that the user is dissatisfied with at least some aspect of the loading of the web resource by the client-side application. Information regarding the operational condition of the application at the time of a reload event may be instructive in identifying any issues or deficiencies exist regarding the web resource, the client-side application or the server. Code for displaying the web page may include one or more detection scripts which instruct the client-side application and/or the server-side application to detect a reload event, to capture the information upon the initiation of the reload event and to transfer the captured information back to the server, where the information may be compared against thresholds or tolerances to determine whether any such issues or deficiencies exist.

23 Claims, 11 Drawing Sheets

400

| 410 | URL | WWW.READY.GOV |
|---|---|---|
| 412 | LOAD DATE/ TIME | 30 OCT 2012  01:26:15 |
| 414 | RELOAD DATE/ TIME | 30 OCT 2012  01:26:57 |
| 416 | TIME BETWEEN LOADS | 00:00:42 |
| 420 | BROWSER NAME/ VER. | MOZILLA 1.0 |
| 422 | OPERATING SYSTEM | WINDOWS 95 |
| 424 | LOCATION | HOBOKEN, NJ |
| 426 | IP ADDRESS | 66.70.74.80 |

*FIG. 4*

| | EVENT | URL | LOAD DATE/TIME | RELOAD DATE/TIME | ELAPSED TIME | BROWSER | OS | LOCATION | IP ADDRESS |
|---|---|---|---|---|---|---|---|---|---|
| 530 | 1 | www.ready.gov | 29Oct2012 23:15:11 | 29Oct2012 23:15:24 | 00:00:13 | NAVIGATOR 4.0 | WINDOWS 95 | RIVER EDGE, NJ | 67.83.216.74 |
| 532 | 2 | www.ready.gov | 29Oct2012 23:28:10 | 29Oct2012 23:28:21 | 00:00:11 | CHROME 8 | WINDOWS XP | HIGHLANDS, NJ | 12.160.38.11 |
| 534 | 3 | www.ready.gov | 29Oct2012 23:57:29 | 29Oct2012 23:57:41 | 00:00:12 | IE 6 | WINDOWS 7 | FRANKLIN LAKES, NJ | 74.8.69.55 |
| 536 | 4 | www.ready.gov | 29Oct2012 00:27:20 | 29Oct2012 00:28:10 | 00:00:50 | SAFARI 3 | MAC OS X | MONMOUTH, NJ | 64.19.13.14 |
| 538 | 5 | www.ready.gov | 30Oct2012 00:51:09 | 30Oct2012 00:51:16 | 00:00:07 | IE 7 | LINUX | PISCATAWAY, NJ | 12.3.170.34 |
| 540 | 6 | www.ready.gov | 30Oct2012 01:10:12 | 30Oct2012 01:10:46 | 00:00:34 | SAFARI 2 | MAC OS X | HOBOKEN, NJ | 66.96.5.18 |
| 542 | 7 | www.ready.gov | 30Oct2012 01:26:15 | 30Oct2012 01:26:57 | 00:00:42 | MOZILLA 1.0 | WINDOWS 95 | HOBOKEN, NJ | 66.70.74.80 |
| 544 | 8 | www.ready.gov | 30Oct2012 01:38:23 | 30Oct2012 01:38:37 | 00:00:14 | IE 6 | VISTA | PARAMUS, NJ | 64.211.19.18 |
| 546 | 9 | www.ready.gov | 30Oct2012 01:48:41 | 30Oct2012 01:49:26 | 00:00:45 | IE 8 | WINDOWS XP | HOBOKEN, NJ | 12.149.3.126 |
| 548 | 10 | www.ready.gov | 30Oct2012 02:02:37 | 30Oct2012 02:04:04 | 00:01:27 | CHROME 16 | ANDROID | HOBOKEN, NJ | 64.94.42.34 |
| 550 | 11 | www.ready.gov | 30Oct2012 02:27:18 | 30Oct2012 02:27:22 | 00:00:04 | IE 7 | WINDOWS XP | CHERRY HILL, NJ | 174.57.69.17 |
| 552 | 12 | www.ready.gov | 30Oct2012 02:45:19 | 30Oct2012 02:46:54 | 00:01:35 | FIREFOX 11 | LINUX | CAMDEN, NJ | 173.61.88.87 |
| 554 | 13 | www.ready.gov | 30Oct2012 03:18:14 | 30Oct2012 03:18:27 | 00:00:13 | CHROME 7 | ANDROID | TRENTON, NJ | 4.237.238.216 |
| 556 | 14 | www.ready.gov | 30Oct2012 03:58:34 | 30Oct2012 03:59:08 | 00:00:34 | CHROME 8 | ANDROID | SANDY HOOK, NJ | 12.160.34.2 |
| 558 | 15 | www.ready.gov | 30Oct2012 04:07:11 | 30Oct2012 04:07:13 | 00:00:02 | CHROME 8 | MAC OS X | BURLINGTON, NJ | 68.80.2.34 |

FIG. 5

```
<html>
<head>
<script>
var overrideException = function(){          ⎫ 711A
//Extend Exceptions object to save errors.   ⎭
}
var initTimeStamp = function(){   ⎫ 712A
//save current time as start time ⎭
}
var initClientMetrics = function(){ ⎫
//Initialize client metrics data.   ⎬ 713A
initTimeStamp();                    ⎪
overrideException();                ⎭
}
//Init Client Metrics to save data at the earliest moment. ⎫ 714A
initClientMetrics();                                       ⎭ var getJSErrors = function(){  ⎫ 715A
//return saved js errors       ⎭
}
var getDuration = function(){                                    ⎫ 720A
//use start time to calculate during on page and return difference⎭
}
var getBreadcrumbs = function(){                                    ⎫ 721A
//return breadcrumbs from breadcrumb registry that loaded on the page⎭
}
var getBrowserMetrics = function(){         ⎫ 722A
//return browser metrics like vendor, url, dimensions ⎭
}
var getClientMetrics = function(){ ⎫
//Collect client data              ⎪
getJSErrors();                     ⎪
getDuration();                     ⎬ 723A
getBreadcrumbs();                  ⎪
getBrowserMetrics();               ⎪
//return client data               ⎭
}
var sendClientMetrics = function(){ ⎫
//get client metrics and send them  ⎬ 724A
getClientMetrics();                 ⎪
//send to backend                   ⎭
}
var registerBreadcrumb = function(){ ⎫ 725A
//Add breadcrumb to breadcrumb registry. ⎭
}
window.onunload=sendClientMetrics;  ⎬ 726A
</script>
</head>
```

*FIG. 7A*

```
                                                        ╱730A
  <body>
  <h1> Web Page </h1>─732A
  <img id="breadcrumb_1" class="breadcrumb" src = "breadcrumb.jpg" height="5" ⎫
  width="5" onload="registerBreadcrumb()"/>                                   ⎬740A
  <br>                                                                        ⎭

734A─<p><a href = "external.html">Link to External Content</a></p>
  <img id="breadcrumb_2" class="breadcrumb" src = "breadcrumb.jpg" height="5" ⎫
  width="5" onload="registerBreadcrumb()"/>                                   ⎬740A
  <br>                                                                        ⎭

<p><b>Bulleted List</b></p>─736A
  <img id="breadcrumb_3" class="breadcrumb" src = "breadcrumb.jpg" height="5" ⎫
  width="5" onload="registerBreadcrumb()"/>                                   ⎬740A
  <ul>                                                                        ⎭
       <li>List Entry 1</li> ⎫
       <li>List Entry 2</li> ⎬738A
       <li>List Entry 3</li> ⎭
  </ul>
  <img id="breadcrumb_4" class="breadcrumb" src = "breadcrumb.jpg" height="5" ⎫
  width="5" onload="registerBreadcrumb()"/>                                   ⎬740A
                                                                              ⎭
  </body>
  </html>
```

*FIG. 7A, CONT'D*

INTERACTIVITY ANALYSES OF WEB RESOURCES BASED ON RELOAD EVENTS

BACKGROUND

Computer users may access the vast resources of the World Wide Web using web browsers and other like client-side applications, which generally operate by receiving code written in a computer language such as Hypertext Markup Language (or "HTML") from one or more servers and/or server-side applications according to a certain protocol, such as Hypertext Transfer Protocol (or "HTTP"); parsing the code into a Document Object Model (or "DOM"); and assembling the DOM into a web page that may be displayed to a user on a user interface. Such browsers or other applications typically include engines for translating information received from a server into content that may be displayed on the user interface, interpreters for parsing and executing script, and databases or other data stores for storing information in the form of "cookies," or files that relate to a user's browsing activity and may be retrieved by the same web site or other web sites in the future.

The display of a web page on a web browser begins with the initiation of a load event, which causes the web browser to transmit a request for one or more files associated with a Uniform Resource Locator (or "URL") or other file location targeted by the load event. Such load events may include the entry of a URL into an address box or address bar; the selection of an image or set of text that may be hyperlinked to a URL; the selection of a bookmark, a home button or any other feature that may be linked to or otherwise associated with a URL; or a shut-down of the web browser and a subsequent return to the web page upon a restart of the web browser. When a user of a web browser provides the browser with a load event, the web browser may perform a search of various data stores, sometimes called a Domain Name System (or "DNS") "lookup," for an Internet Protocol (or "IP") address associated with the URL. For example, when attempting to locate IP addresses that may be associated with the URL, the browser may search its own cached records, or records stored in caches on the operating system or router through which access to the Internet is provided, as well as external sources.

Once an IP address associated with the URL is identified, the browser sends a request for the web page at the URL, in accordance with the HTTP, to the server where the files associated with the page are located, and the server handles the request by providing a response to the browser in the form of code expressed in one or more computer languages, such as HTML. The browser may then begin to render the code into the web page, and may transmit requests, as necessary, for files that may be embedded within the code provided by the server. For example, where the code comprises HTML and refers to images, multimedia or other files that may be found at other locations (e.g., on external servers), the browser may transmit requests for each of the files. As the code and other files are received by the browser from the server, the browser may begin to assemble the web page for display on a user interface.

Occasionally, during the loading of a web page, or after the loading of a web page has completed, a user of a web browser may elect to initiate a reload event which results in the retransmission of a request for the one or more files associated with the same URL that was provided in the load event that prompted the initial loading of the page. Most commonly, a reload event includes the selection of a "reload" or "refresh" button, which resubmits the URL for the web page that was most recently submitted to the servers, and causes the web browser to begin to load the web page again. Other reload events may include, but are not limited to, the reentry of the same URL that was provided with the load event into an address bar or address box, the reselection of an image or set of text that is hyperlinked to the same URL that was provided with the load event (i.e., selecting a hyperlink in a web page or electronic mail document, the selection of a bookmark for a web page that is currently displayed), or any step that returns the web browser to the web page following a shut-down or other action that secures the operation of the web browser.

A user of a client-based application such as a web browser may initiate a reload event for a variety of reasons. First, the user may be dissatisfied with the rate at which the web page, or one or more elements expressed thereon, loads on the display. Second, one or more of the elements intended to be expressed on a web page, or the entire web page itself, may ultimately fail to load. Third, and perhaps most importantly, the user may be hindered or prevented from performing one or more tasks that prompted the user to visit the web page in the first instance. In this regard, the user's initiation of a reload event, which results in the submission of a second or subsequent request for a web page, may be detected and interpreted as an expression of dissatisfaction with at least one aspect of the web page, or an indication that the user is experiencing a difficulty in performing one or more tasks such as those that may ultimately be performed after the reload event. Accordingly, the initiation of a reload event, or the frequency with which users initiate reload events (e.g., the number of reload events initiated per unit time), may be tracked and analyzed to determine the interactivity of the web page and/or whether any remedial measures are required with respect to the web page, the client-side application or the server on which the web page and associated content is stored.

BRIEF DESCRIPTION OF THE DRAWINGS

FIG. 4 is a table of data captured at a client-side application for transmission to systems or methods for analyzing the interactivity of a web resource based on reload events, in accordance with embodiments of the present disclosure.

FIG. 5 is a table of data captured at client-side applications and analyzed by systems and methods for analyzing the interactivity of a web resource based on reload events, in accordance with embodiments of the present disclosure.

FIG. 7A is a set of code for displaying a web page to be analyzed by systems and methods for analyzing the interactivity of a web resource based on reload events, in accordance with embodiments of the present disclosure.

DETAILED DESCRIPTION

Figure 1:
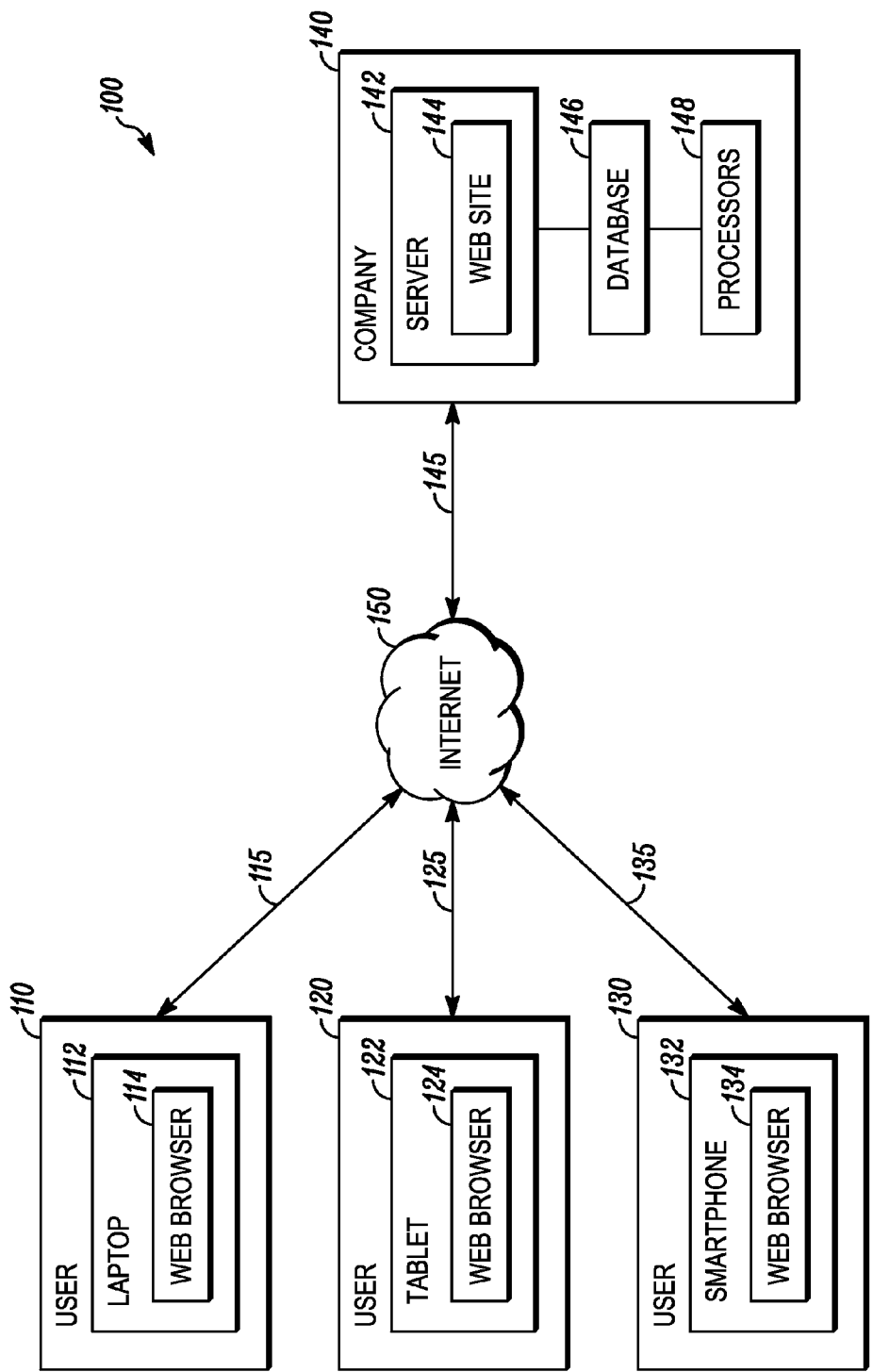
FIG. 1 is a block diagram of a system for analyzing the interactivity of a web resource based on reload events, in accordance with embodiments of the present disclosure.

As is set forth in greater detail below, the present disclosure is directed to systems and methods for analyzing or monitoring the interactivity of one or more web resources based on reload events that may be received or detected from browsers operated by users who requested the one or more web resources. Specifically, one embodiment of the present disclosure describes systems and methods for analyzing the interactivity and operability of a web resource that has already been requested from a server or other external source based on the receipt or detection of a reload event for the web resource, which may be accompanied by a predefined set of data that is captured regarding the web resource, the browser and/or the computer hardware on which the browser is operating. Such reload events may include the selection of a "refresh" or "reload" button on a browser that is displaying the web resource; the reentry of a Uniform Resource Locator (or "URL") that corresponds to the web resource into an address box or address bar on the browser; the selection of an image, button or a set of text hyperlinked to the same URL corresponding to the web resource; or any other action which submits a second or subsequent request for the web resource from the browser to the server. Where any aspect of the captured data exceeds a predetermined threshold, or otherwise indicates that a fault has occurred, the interactivity of the web resource, the browser and/or the computer hardware may be determined to be inadequate, and one or more remedial measures may be manually or automatically taken to address the inadequacy.

Those of ordinary skill in the art are aware that web resources (including but not limited to web pages) are constructed from sets of code, usually written in Hypertext Markup Language (or "HTML"), which are transferred from a server to a browser upon the receipt of a request from a user and/or the browser in the form of a load event. The sets of code may include features for displaying text, images or media, as well as links to other external content, or other functionality in the form of scripted instructions for performing dynamic, functional tasks in run-time environments such as those that are provided by browsers and programmed in one or more scripting languages (e.g., JavaScript®). When a browser receives a load event, such as in response to an entry of a URL into an address box or address bar on the browser, a selection of a button or bookmark provided by the browser, or a selection of a hyperlinked image or set of text, the browser places a call to a server. Once the call is received by the server, the code and any associated files are transmitted to the browser, where one or more engines renders and parses the code and associated files into recognizable content in the form of a Document Object Model (or "DOM"), and provides rendered and parsed content consistent with the DOM onto a user interface. Web resources may include text, images and/or media displayed in one or more web pages, as well as additional files such as audio (e.g., .MP3 or .WMA files), video (e.g., .WMV or .AVI files) or other text-based or multimedia content that may be transmitted over a network and provided to a user through a web browser or one or more like applications.

Some of the types of scripted instructions that may be provided within code for generating a web resource may include detection scripts that detect and store information regarding the operation or status of a client-side application (such as a web browser) or computer hardware on which the client-side application is operating, and to which the web resource is provided. For example, the "navigator" object in JavaScript® may detect the name and/or version of the client-side application, and the language of the application or operating system or the platform on which the application operates. Additionally, similar instructions may detect the time or date at which the web resource is requested from the user, or the location from which the user requested the web resource. Such information may be stored on any data store on the client side (e.g., an HTML5 storage file or a "cookie"), and transmitted to the server side when connectivity between the client-side application and a server-side application is confirmed. For example, where a user of a web browser initiates a reload event when a web resource fails to load due to a network failure, the web browser may capture information in accordance with a detection script, despite being unable to communicate with the server until the network failure is resolved. In such situations, the information may be transmitted to the server and/or a server-side application once the connectivity between the web browser and the server and/or the server-side application is restored.

The systems and methods of the present disclosure may utilize detection scripts or other features to detect or record operational data regarding the client-side application or computer machines onto which a web resource is provided, and may analyze such data to determine the level of interactivity of the web resource, or whether any issues or adverse conditions for providing the web resource exist. In response to the receipt or detection of a reload event from a user of a client-side application, i.e., a second or subsequent call for a particular web resource, the systems and methods of the present disclosure may request such operational data from the client-side application and, upon receipt of the data from the application, analyze the data to determine whether the reload event is indicative of one or more operational issues with the application. For example, a user may select a "refresh" or a "reload" button on a web browser if a requested web page fails to load or is not loaded after a certain period of time, or if a particular aspect (e.g., an image or video file) that is intended to be displayed in the web page fails to load with the page. Therefore, the selection of the "refresh" or "reload" button may indicate that a page is not loading or is loading slowly, or that certain elements of a web page are failing to load. Additionally, the time elapsed between the receipt of an initial load event from a user of a web browser requesting a web resource (i.e., the entry of a URL into an address box or the selection of a hyperlinked image or set of text) and the receipt or detection of a reload event from the user of the web browser requesting the web resource for a second or subsequent time (i.e., the selection of a "refresh" or a "reload" button) may also provide one or more indicia as to the level of interactivity of the web resource. Finally, where a user provides a reload event from a particular location, the user's location may be analyzed to determine whether any issues or adverse events may relate to that particular location (i.e., a network outage or delay affecting one or more users in an area).

According to one embodiment of the present disclosure, a user of a web browser operating on a tablet computer requests a web page by entering a URL, including a domain name and a file path, into an address box on a web browser. In response to this load event, an IP address associated with the URL is transmitted from the browser to a server, and a set of HTML code and any associated files are then transmitted from the server to the browser. The set of code may include a subset of code, such as a detection script, that records data regarding the current operational status of the browser and the tablet computer, including the name and version of the browser and operating system on the computer; the time and date of the reload event; the IP address of the computer; the location of the computer; the time elapsed between the initiation of the load event and the initiation of the reload event; the status of the page at the time of the reload event (i.e., the status of the loading of the HTML and any files embedded therein) once a reload event is initiated. As the web page is loading on the web browser, the user selects the "refresh" button on the browser, thereby initiating a reload event, and the data regarding the operational status of the browser and the tablet computer is recorded and transmitted to the server.

Once the data is captured and transmitted to the server, the server analyzes the data to identify any reasons why the user may have elected to initiate a reload event. For example, the data may reflect, either alone or in combination with data regarding other reload events received or detected from other computers, that the web page is not loading within a sufficient time period, i.e., if the rate at which the web page loads falls below a predefined threshold, or that a particular element of the web page is not loading at all. Additionally, there may be a problem with loading the web page on the particular browser or version thereof that is operating on the tablet computer. Finally, there may be an independent, unknown and/or localized fault that is preventing the web page from loading on the particular web browser and/or the computer on which the web browser is operating. In such situations, one or more issues with the web page may be identified on the basis of the reload event, which may alert the operators of the server that such issues may exist with regard to the text or embedded files in general, or with the loading of the web page on the particular browser or computer operated by the user.

According to another embodiment of the present disclosure, an application for accessing a social network is installed on a mobile phone. The application permits a user of the mobile phone to review various pages and postings made by members of the social network at the user's request. The application includes a set of code that is programmed to collect and report operational data to the social network regarding the status of the mobile phone, the application and the connectivity between the mobile phone and the social network over a cellular or wireless fidelity (or "WiFi") connection once a user provides a reload event, which may include a second or subsequent request for a previously viewed page or posting, and to transmit the operational data to the social network once a sufficient level of connectivity is restored.

The operational data to be collected and may include the identity of the social network member who submitted the reload event; the rate of transmission between the mobile phone and the social network, expressed in megabits per second (or "Mbps") at the time that the reload event was initiated; the particular brand of mobile phone and the version of the operating system installed thereon; the location of the mobile phone (which may be detected using onboard hardware such as a Global Positioning System (or "GPS") receiver or through triangulation or location identification with one or more cellular towers) at the time that the reload event was requested; the page or posting that the user intended to view; and any available data regarding the connection between the mobile phone and the social network, such as the cellular cell or tower with which the mobile phone is communicating. Once a reload event is initiated, the information is stored in a cache or other data store on the mobile phone, and transmitted to the social network once connectivity between the mobile phone and the social network is confirmed, which may occur when the mobile phone is within range of an authorized WiFi connection hub or cellular tower, or when the mobile phone is synchronized with one or more general computers, such as through a Universal Serial Bus (or "USB") connection to a desktop or laptop computer.

By including such features within its mobile application, the social network is able to monitor its interactivity with particular types of mobile devices on which the application is installed, and to identify and assess any faults that may be encountered by users while accessing the social network. For example, where a particular member of a social network frequently submits reload events in response to pages or postings, the receipt of data from the application in response to a reload event initiated by that particular member may be deemphasized or scored as less likely to be indicative of a fault within the social network or its connectivity with the application. Where multiple members of the social network submit reload events in response to a single page or posting, the single page or posting may be scored as more likely to be indicative of a fault within the social network or its connectivity with regard to the text and/or multimedia displayed thereon. Where members of the social network submit reload events when their mobile phones are connected to the Internet via a cellular telephone connection, but not when their mobile phones are connected to the Internet via a WiFi connection, the social network may troubleshoot the application software and/or its own servers to determine whether the application is having any difficulties connecting to the social network over WiFi connections. Finally, where the rate at which members of the social network submit reload events in connection with multiple pages or postings exceeds a standard, predetermined threshold probability or frequency, it may be understood that one or more general issues may be plaguing the social network as a whole.

According to yet another embodiment of the present disclosure, a server-side application is programmed to augment existing web pages with detection scripts for monitoring the interactivity with respective client-side applications. When a user initiates a load event from a client-side application requesting a particular web page that is hosted at a server, the server-side application inserts a particular detection script into the code for displaying the web page before transmitting the code to the client-side application. The detection script contains code for inserting one or more virtual milestones into the DOM of the web page, as well as one or more scripted events for recording data regarding the operational status of the browser and/or the computer that requested the web page upon the initiation of a reload event, and for transmitting the data to the server when the connectivity between the client-side application and the server-side application is confirmed. The data may include the date and time that the reload event was initiated; the particular type of reload event that was initiated (e.g., the selection of a "refresh" or a "reload" button, a second or subsequent entry of a URL into an address box, or the second or subsequent selection of a bookmark or hyperlink); or the amount and extent of the web page that had been loaded by the client-side application at the time that the reload event was initiated, which may be measured or assessed at least in part by the number of virtual milestones that had been successfully loaded by the client-side application. The virtual milestones may comprise portions of text, images, frames, elements or other aspects of the web page that may be expressed or embedded in the code from which the web page is generated.

Once a reload event is initiated, the data is captured by the client-side application and transmitted to the server-side application, where the data may be aggregated with other data captured at the server and/or by the server-side application and analyzed to determine any possible issues that may have prompted the user to initiate the reload event. In particular, the number and location of the virtual milestones that were ultimately transferred to the web browser and/or successfully displayed on the web page may indicate a location, within the DOM, of one or more possible issues that precluded the web page from properly loading, and may have prompted the user to initiate a reload event.

Accordingly, the systems and methods of the present disclosure may be utilized to monitor the interactivity of a web resource by analyzing data associated with the initiation of reload events from applications or machines on which the web resource was requested or loaded, or from applications or machines at which the web resource is hosted. For example, such data may include any operational information relating to the web resource; the client-side application or any client-side hardware from which the web resource was requested; the server-side application or server-side hardware from which the web resource was generated; or any other actions taken by the user prior to or following the receipt or detection of the reload event. Where the initiation of a reload event is unexpected, or where the frequency at which reload events are initiated exceeds a predetermined threshold, it may be understood that one or more issues exists with regard to the interactivity of the web resource at least with regard to the web resource, the client-side application, the server-side application, or any hardware or software associated therewith.

Referring to FIG. 1, one system 100 for analyzing the interactivity of a web resource based on reload events is shown. Referring to FIG. 1, the system 100 includes users 110, 120, 130 (or members, customers, consumers, shoppers or buyers), and a company 140 (or host, marketplace or other organization), connected to one another across a network 150, such as the Internet.

The users 110, 120, 130 can be any entities or individuals that wish to access one or more resources associated with entities or individuals, such as the company 140, over the Internet 150 using client applications such as a web browser 114 running on a laptop computer 112, a web browser 124 running on a tablet computer 122, or a web browser 134 running on a smartphone 132. The users 110, 120, 130 may connect to or otherwise communicate with the company 140 by sending and receiving digital data over the network 150 using the laptop computer 112, the tablet computer 122 and/or the smartphone 132, which may be connected to the Internet 150 through wired or wireless means, as indicated by lines 115, 125, 135. The web browsers 114, 124, 134 provide one or more user interfaces for the users 110, 120, 130 to view and/or communicate with the company web site 144.

Furthermore, those of skill in the pertinent art will recognize that the users 110, 120, 130 may use a keyboard, keypad, mouse, stylus, touch screen, or other device (not shown) or method for interacting with the laptop computer 112 and/or the web browser 114; the tablet computer 122 and/or the web browser 124; the smartphone 132 and/or the web browser 134; or the company 140, the server 142, the web site 144, the database 146 and/or the processors 148, or to "select" an item, link, node, hub or any other aspect of the present disclosure.

The company 140 may be any entity or individual that maintains a networked computer infrastructure, including a server 142 hosting a web site 144, a database 146 and/or one or more computer processors 148 for any reason, including but not limited to selling or otherwise making items available for download, purchase, rent, lease or borrowing by customers, such as users 110, 120, 130 from an online marketplace or other processing system. The website 144 may be implemented using one or more physical computer servers 142, which connect or otherwise communicate with the network 150, as indicated by line 145, by the sending and receiving of digital data. In addition, where the company 140 is an online marketplace, items made available at the marketplace 140 or ordered by the users 110, 120, 130 may be made by or obtained from one or more third party vendors (or merchants or manufacturers), and the company 140 itself may be a merchant or vendor.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Process steps described herein as being performed by a "user" or a "company" may be automated steps performed by their respective computer systems, or implemented within software modules (or computer programs) executed by one or more general purpose computers. Moreover, process steps described as being performed by a "user" or a "company" may be typically performed by a human operator via the laptop computer 112, the tablet computer 122, the smartphone 132 or the server 142 but could, alternatively, be performed by an automated agent.

The users 110, 120, 130 and the company 140 may use any web-enabled or Internet applications or features, such as the web browsers 114, 124, 134 or the web site 144, or any other client-server applications or features including electronic mail (or E-mail), or other messaging techniques, to connect to the Internet 150 or to communicate with one another, such as short or multimedia messaging service (SMS or MMS) text messages. In addition, the laptop computer 112, the tablet computer 122, the smartphone 132 and the server 142 may include any of a number of computing devices that are capable of communicating over the network, including but not limited to set-top boxes, personal digital assistants, mobile phones including "smartphones," digital media players, web pads, tablet computers, laptop computers, desktop computers, electronic book readers, and the like. The protocols and components for providing communication between the laptop computer 112, the tablet computer 122, the smartphone 132 and the server 142 are well known to those skilled in the art of computer communications and thus, need not be described in more detail herein.

The data and/or computer executable instructions, programs, firmware, software and the like (also referred to herein as "computer executable" components) described herein may be stored on a computer-readable medium that is within or accessible by the laptop computer 112, the tablet computer 122, the smartphone 132 and/or the server 142, and having sequences of instructions which, when executed by a processor (such as a central processing unit, or CPU), cause the processor to perform all or a portion of the functions and/or methods described herein. Such computer executable instructions, programs, software and the like may be loaded into the memory of the laptop computer 112, the tablet computer 122, the smartphone 132 or the server 142 using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Users of web browsers or other like client-side applications may initiate reload events with respect to web resources that have been requested from server-side applications for a variety of reasons. For example, a user may request that a web page be reloaded or refreshed if the web page is taking too long to load, or if one or more elements of the web page fail to load. The user may also request that a web page be reloaded or refreshed to update the display of information thereon, or if the web page contains information that is unexpected or inaccurate. Accordingly, information that may be deduced from the initiation of one or more reload events may provide insight into the mindset of a user of the web browser and, therefore, into the quality, accuracy or validity of the web page expressed thereon, or the interactivity between the web browser and the one or more servers from which the web page originated. In particular, where a user initiates a reload event, the very next interaction initiated by the user following the reload event may be particularly instructive, for, in many instances, it may be assumed that the user would have initiated that interaction instead of the reload event if he or she were able to do so.

For the purposes of illustration, some of the systems and methods disclosed herein may be referenced primarily in the context of a web site maintained by a company for access by various computer users over the Internet, such as the web site 144 maintained by the company 140 and accessed by users 110, 120, 130 as is shown in FIG. 1. As will be recognized by those of skill in the art, however, the systems and methods disclosed herein may also be used in many other situations, and their utility is not limited to any of the preferred embodiments described herein.

Figure 2:
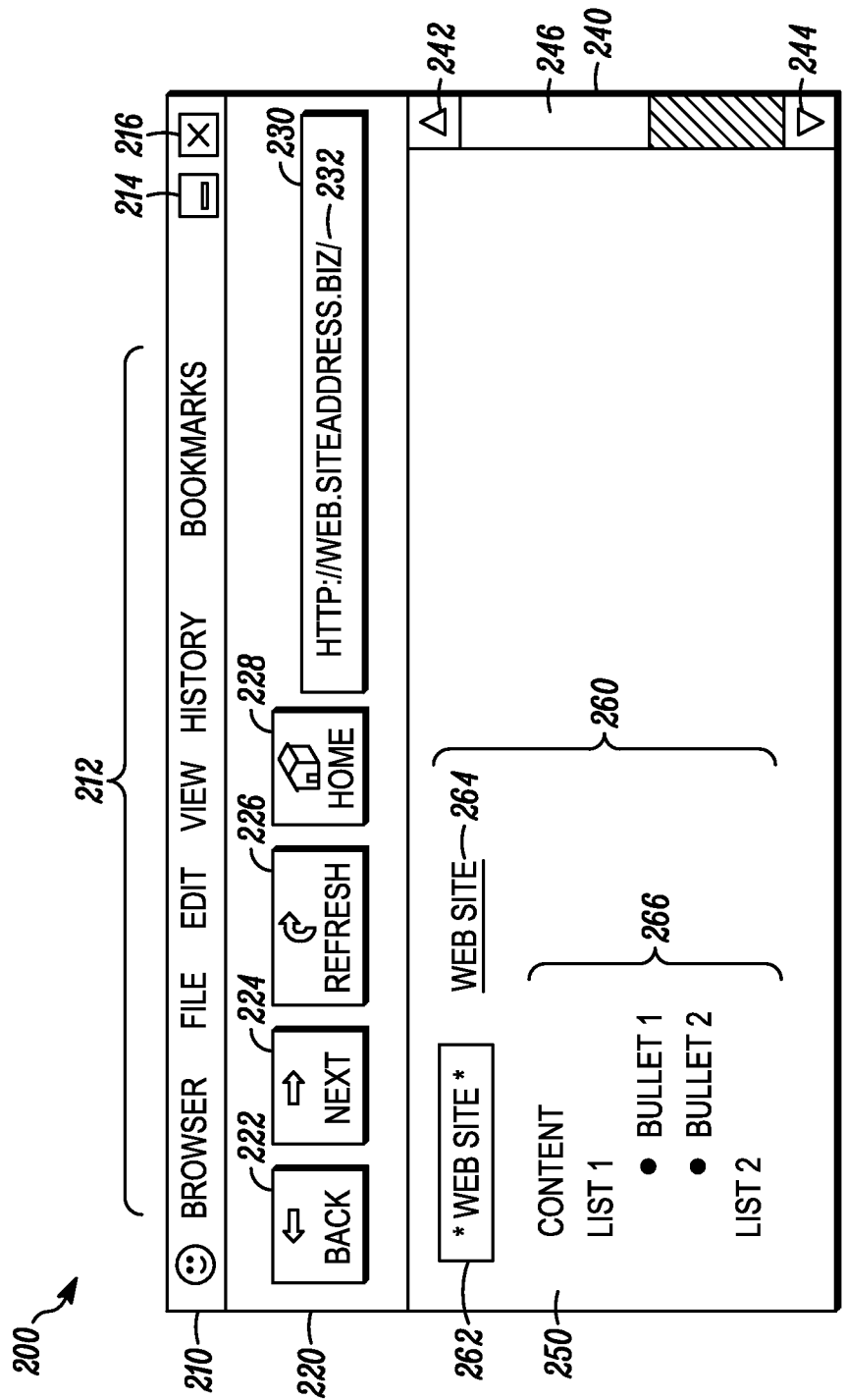
FIG. 2 is one embodiment of a web browser for rendering a web page and for analyzing the interactivity of a web resource based on reload events, in accordance with embodiments of the present disclosure.

Referring to FIG. 2, one embodiment of a web browser 200 that may be utilized in connection with the systems and methods of the present disclosure is shown. The website includes a menu bar 210, an option bar 220, an address bar 230, a slider bar 240 and a web page 250 including a plurality of content 260.

The menu bar 210 includes a plurality of selectable options 212, as well as a button 214 for minimizing the browser 200 and a button 216 for closing the browser 200. The option bar 220 includes a back button 222 and a next button 224 for returning or advancing, respectively, to the two most recently viewed web pages. The option bar 220 also includes a refresh button 226 for reloading the content of the web page 250 that is currently displayed, and a home button 228 for accessing a specific page that is ordinarily displayed once the web browser 200 is opened.

The address bar 230 includes a space into which the text-based address or URL 232 of a specific web resource may be entered. The slider bar 240 includes a variety of features for navigating through the content of the web page 250, including arrows 242, 244 and a slider 246 for vertically translating the portion of the web page 250 shown in the browser 200. The plurality of content 260 includes an image 262, a hyperlinked set of text 264 and a displayed set of text 266.

Those of ordinary skill in the art understand that users of a web browser, such as the web browser 200 shown in FIG. 2, may initiate a load event in a variety of ways, in accordance with the present disclosure. First, a user may enter a URL or other file location, such as the address or URL 232, into the address bar 230, which will result in the transmission of a call from the web browser 200 to one or more servers on which the web page is located. Second, the user may select the home button 228, which will result in the transmission of a call for a predetermined web page that has been defined as the "home" page for the web browser 200. Third, the user may select one or more bookmarks from the drop-down menu option shown in the menu bar 210, which will also result in the transmission of a call for a web page that may be associated with the selected bookmark. Fourth, the user may select one or more hyperlinked features expressed in the web page 250, such as the set of text 264, or any other feature that is linked to or otherwise associated with a web resource. A load event may include any of these actions, as well as any other action that results in the transmission of a call for a web resource from a client-side application to one or more servers, in accordance with the present disclosure.

Likewise, those of ordinary skill in the art also understand that users of a web browser, such as the web browser shown in FIG. 2, may initiate a reload event in a variety of ways, in accordance with the present disclosure. First, and most commonly, a user may select the "refresh" button 226 shown in the option bar 220. Second, the user may reenter the same URL or file location, such as the address or URL 232 that caused the display of the web page 250, into the address bar 230. Third, the user may select a bookmark from the drop-down menu shown in the menu bar 210, or one of the hyperlinked features shown in the web page 250, if the selected bookmark or the selected hyperlinked feature is associated with the address or URL 232 that caused the display of the web page 250. Fourth, the user may take any step that shuts down the web browser 200, such as by selecting the button 216, and subsequently return to the web page once the web browser 200 is restarted. A reload event may include any of these actions, as well as any other action that results in the retransmission of a call for a web resource from a client-side application to one or more servers, for a second or subsequent time, to one or more servers, in accordance with the present disclosure.

Figure 3:
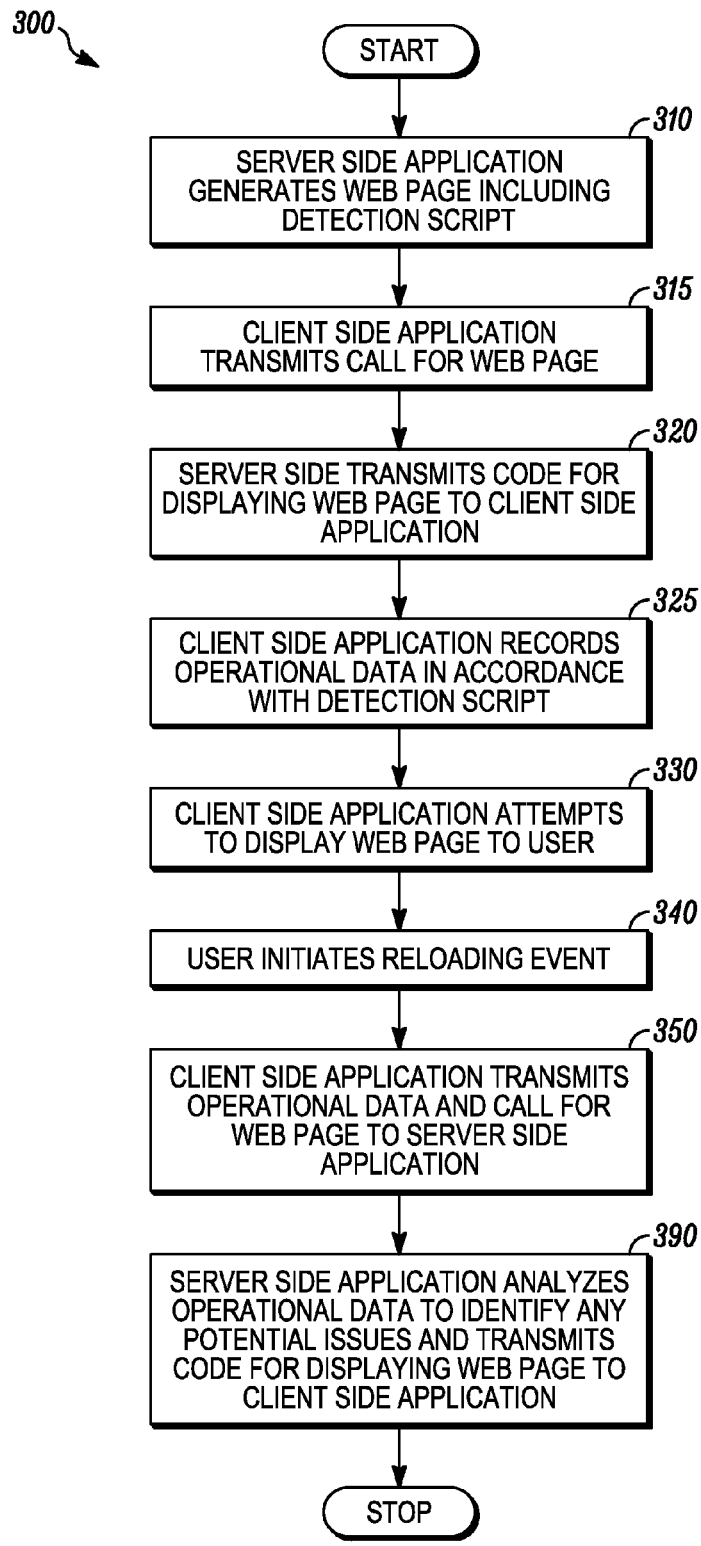
FIG. 3 is a flow chart of a process for analyzing the interactivity of a web resource based on reload events, in accordance with embodiments of the present disclosure.

As is discussed above, operational data that may be captured during a reload event initiated at a client-side application, which may include data captured by the client-side application or by one or more server-side applications, may be analyzed by one or more server-side applications to determine whether any operational issues exist with regard to the one or more web resources for which the reload event was intended. Referring to FIG. 3, a flow chart 300 representing one embodiment of a process for performing an interactivity analysis based on a reload event is shown. At step 310, a server-side application generates a web page that includes detection script. For example, the server-side application may create a web page including such detection script automatically, or may insert detection script into a previously generated web page, wherein the detection script is intended to capture data regarding the operational status and interactivity of a web page, as well as a client-side application and/or a computer on which the application operates. At step 315, a client-side application may transmit a call for the web page. For example, a user may enter a URL or web address corresponding to the web page into an address box on a web browser operating on one or more computers, or select a hyperlinked image, a hyperlinked set of text or a bookmark corresponding to the web page.

At step 320, the server-side application transmits code for displaying the web page to the client-side application. For example, a server may transmit text in the form of HTML, Java or JavaScript, or any other recognizable computer language to the browser. At step 325, the client-side application records operational data in accordance with the detection script, and at step 330, the client-side application attempts to display the web page to the user. For example, where the detection script calls for the computer system to record the type and version of the browser and/or computer from which a load event or a reload event was initiated, or the times at which a load event or a reload event is initiated, such information may be recorded as the browser attempts to render and display the web page to the user.

At step 340, the user initiates a reload event, which may be initiated by the selection of a "refresh" or "reload" button, the reentry of text constituting the original web page into the address bar or address box, the selection of an image or set of text that is hyperlinked to the same web page for which a call was transmitted to the server in step 315, or by any other means for attempting to request, for a second or subsequent time, that the web page be displayed on the web browser. At step 350, the client-side application transmits the both the operational data that was recorded at step 325 and a call for the web page to the server side application. At step 390, the server side application analyzes the operational data received from the client-side application, as well as any other operational data captured or observed at the server and/or the server-side application, to identify any potential issues, and again transmits code for displaying the web page to the client-side application.

Accordingly, information regarding the operational status of a client-side application that requests a web resource from a server-side application, or the operational status of the server-side application or a server on which the web resource resides, may be captured or transmitted to the server-side application in the event that a reload event is received or detected from a user, and analyzed to determine whether any issues regarding the web resource or the server-side application prompted the user to initiate the reload event, in accordance with the systems and methods of the present disclosure. Any type of computer code (including detection scripts or other programmatic features), written in any computer language (including but not limited to HTML or JavaScript®), may be used to capture and transmit the information from the client-side application to the server-side application, or to capture information regarding the operability of the server-side application and/or any affiliated server equipment.

As is set forth above, any type of information regarding the interactivity and operability of a web page, a client-side application that requests the web page, or a computer on which the client-side application operates, may be captured for analysis upon the initiation of a reload event, in accordance with the systems and methods of the present disclosure. For example, regarding the web page, the application may capture the URL of the web page, as well as the time that a load event was initiated to request the web page, and the time that the reload event was initiated. Regarding the client-side application itself, the application may capture a list of web pages or resources that were recently visited or viewed using the application; the status of any antivirus protection software installed and operating thereon; a list of "cookies" or other stored viewing data. Regarding the computer on which the client-side application operates, the application may capture operational data such as the core temperatures of one or more processors installed therein; the speeds of any fans operating therein; the level and extent of available processing power, memory or electrical power (e.g., the availability of alternating current power sources or battery life). Once the data is captured, it may be stored on the client side, and such data and any other pertinent data regarding the web page, the client-side application and/or the computer on which the client-side application is operating, may be transferred to a server-side application and analyzed thereby to determine whether any operational issues or circumstances caused the user to initiate a reload event, instead of taking any other action with respect to a displayed web page.

Likewise, any type of information regarding the interactivity and operability of a server-side application that hosts the web page, or a server on which the server-side application operates, may be captured for analysis upon the initiation of a reload event, in accordance with the systems and methods of the present disclosure. For example, the server-side application and/or the server may receive any data from the client-side application, as well as capture any data at the server side, and append the captured and/or received data to one or more data stores including other similar data. Once received, the data may be scanned or analyzed at the server side on a regular basis, and any tickets, electronic messages and/or other notifications may be generated based on any issues that may be identified therein. Furthermore, the analysis of such data at the server side may be driven by one or more business rules, including the number and/or frequency of any reload events received or detected from client-side applications, the number or frequency of exceptions (i.e., exceptional events) created at or by client-side applications, or the number or frequency of elements or locations within a DOM that fail to load at the client-side application.

Referring to FIG. 4, one example of a table 400 of data that may be captured by a client-side application (e.g., a web browser) and transferred to a server-side application (e.g., a web host) is shown. The table 400 includes the URL of a web resource 410, a date and time 412 at which a load event was submitted for the web resource 410, a date and time 414 at which a reload event was submitted for the web resource, and an elapsed time 416 between the load event and the reload event. Additionally, the table 400 also includes the name and version 420 of the client-side application from which the data was captured, the operating system 422 of the computer on which the browser was operating, and the location 424 and IP address 426 of the computer.

The data shown in the table 400 of FIG. 4 may provide a variety of valuable information regarding to a server-side application. For example, the dates and times 412, 414 at which the load event and the reload event were initiated may indicate to the server-side application that at least one issue in loading content related to the web resource existed on those dates and times 412, 414. Additionally, the elapsed time 416 (i.e., forty-two seconds) between the load event 412 and the reload event 414, which was relatively brief, may indicate that the difficulties in loading the web content were immediately obvious to the user. Next, the browser 420 and the operating system 422 on which the browser 420 was operating may suggest that the web resource may not be properly loading by users of such software or hardware. Further, the location 424 and the IP address 426 may imply a network issue or slowdown in the physical or virtual vicinity of the user. Moreover, where the initiation of the reload event at the date 412 and time 414 shown in the table 400 is the only such reload event to have been initiated within a predetermined time, the interactivity of the web resource may likely be assumed to be sufficient. Conversely, if the elapsed time 416 exceeds a certain threshold, it may be understood that the reload event is related to an operational fault, and is not necessarily an isolated occurrence that may be ignored.

Information regarding the interactivity of a web resource between a client-side application and a server-side application that is captured and transmitted to the server-side application upon the initiation of a reload event, such as the data in the table 400 shown in FIG. 4, may be collectively analyzed along with similar information captured from other client-side applications upon the initiation of reload events, to determine whether such reload events are isolated instances, or whether such reload events are indicative of a broader, aggregate deficiency in the interactivity of the web resource with external users.

Referring to FIG. 5, a table 500 of data is shown. The table 500 relates to specific reload events received or detected with regard to the web resource www.ready.gov, and is sorted by columns, including a number 510 assigned to the reload event, a URL or file location 512 of the web resource, a date and time 514 at which a load event was initiated, a date and time 516 at which a reload event was initiated, an elapsed time 516 between the load event and the reload event. The table 500 also includes data regarding the browser 520 from which each of the reload events was initiated, the operating system 522 on which each of the browsers 520 was operating, and the location 524 and IP address 526 of the computers from which the reload events were initiated. As is shown in FIG. 5, the table 500 is populated with data regarding fifteen reload events 530-538, 540-548, 550-558.

Taken in the aggregate, the data shown in table 500 of FIG. 5 may be analyzed to identify a number of indications as to the interactivity of the web resources that are maintained at the location 512. For example, each of the fifteen reload events 530-538, 540-548, 550-558 was initiated by users who attempted to access the web resource www.ready.gov 512 from similar locations 524 over a five-hour span on Oct. 29 and 30, 2012, thereby implying both a demand for accessing the web resource www.ready.gov from locations in New Jersey, and also a difficulty in doing so, on the dates and times 514, 516 indicated in table 500. Next, because reload events 534, 538, 544, 546, 550 were initiated from the same browser 520 (i.e., Internet Explorer®), it may be inferred that users were having difficulty accessing the web resource 512 from such browsers, or versions thereof. Because reload events 532, 554, 556, 558 were initiated from more obsolete versions of a particular browser 520 (i.e., versions 6, 7 and 8 of Google® Chrome®, which were last made available in 2010), it may be inferred that users were having difficulty loading the web resource 512 on those particular versions of the browser 520. Additionally, because reload events 532, 546, 550 were initiated by users of one particular operating system (i.e., Windows® XP), because reload events 536, 540, 558 were initiated by users of another particular operating system (i.e., Mac® OS X), and because reload events 548, 554, 556 were initiated by users of a third operating system (i.e., Android®), it may be inferred that users were having difficulty loading the web resource 512 on those particular operating systems 522. Finally, because reload events 540, 542, 546, 548 were initiated by users from a common location 524 and at approximate times 516, it may be inferred that a network or other difficulty was preventing users from accessing the web resource 512 from the common location 524 at the approximate times 516.

Any other conclusions or deductions may be drawn from operational data regarding one or more reload events that may be initiated by one or more users. For example, where a plurality of reload events are initiated by a single user who is accessing a web resource, the reload events may be indicative of a localized problem, or a particular error or lack of knowledge as to the operability of the client-side application or the relevant web resource on the part of the user, and may be generally disregarded. Similarly, where a web site that provides news, sports or other information regarding current events receives a significant number of reload events from users, such events may be indicative not of a problem or interactivity issue with the web site, but rather a heightened demand for the information that is provided there. Moreover, the data shown in table 500 of FIG. 5 may be utilized to derive one or more thresholds or limits with respect to the dates or times 516 or particular locations 524 at which reload events have been initiated, or the elapsed times 516 between the initiation of load events 514 and the initiation of reload events 516. Accordingly, the systems and methods of the present disclosure may monitor the number and frequency of reload events, and to analyze any other information captured thereby, to separate aberrant, out-of-the-ordinary reload events from those that may ordinarily be expected during normal operation, and establish tolerance levels associated with the receipt or detection of reload events.

One important metric that may be monitored in determining whether any issues or problems exist with regard to a web resource, based on one or more reload events, is the very next interaction that is performed by the user following the initiation of a reload event. For example, where a user who is viewing a web page on a web browser selects a "refresh" button and then, once the web page is displayed following the selection, selects a link displayed on the web page, it may be inferred that the user encountered some issue or circumstance that hindered the display or operation of the link which ultimately prompted the user to select the "refresh" button. In theory, if no such issues or circumstances existed, the user likely would have selected the link at the time that he or she selected the "refresh" button, if he or she were able to do so.

Figure 6:
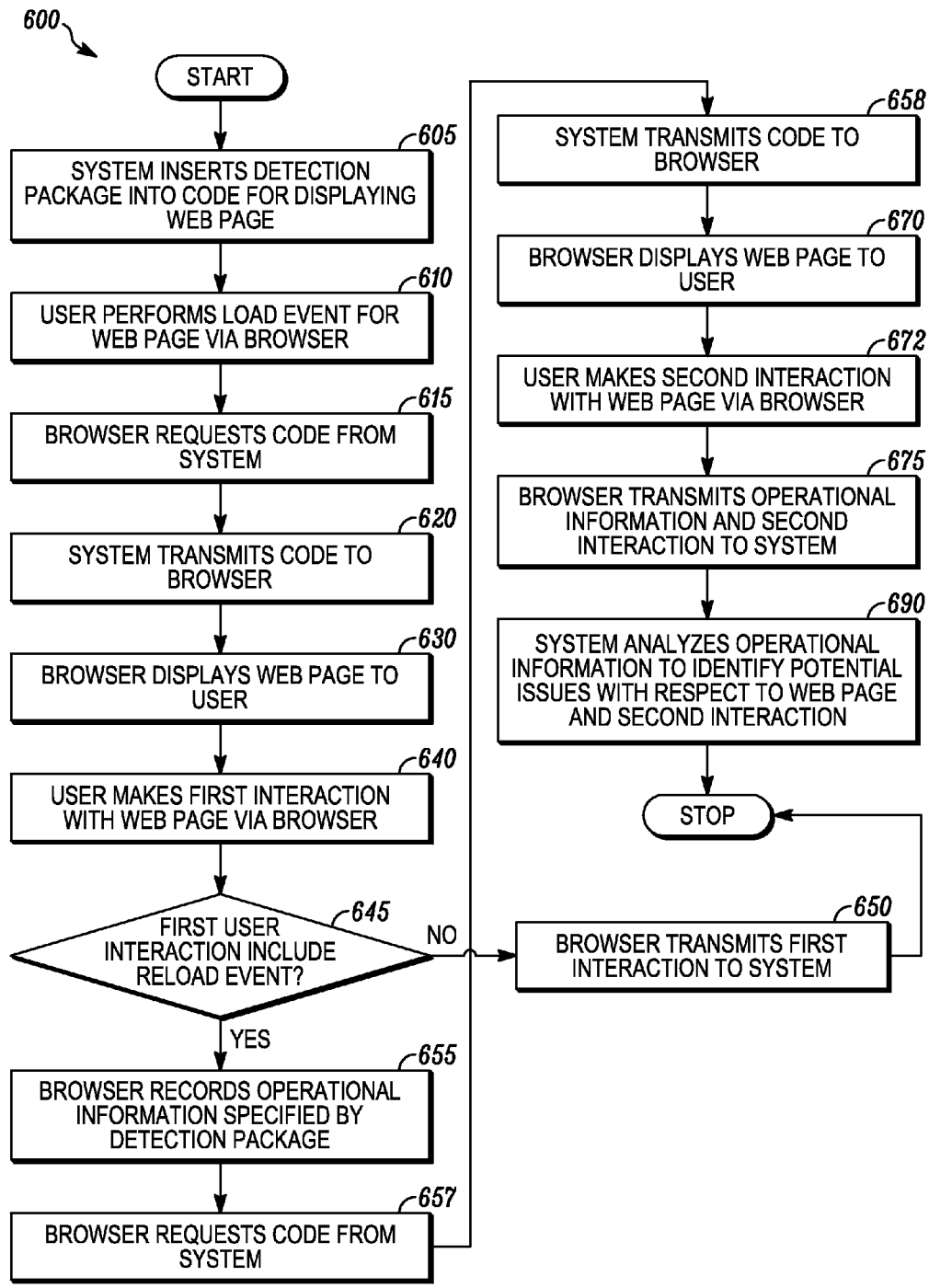
FIG. 6 is a flow chart of a process for analyzing the interactivity of a web resource based on reload events, in accordance with embodiments of the present disclosure.

Referring to FIG. 6, a flow chart 600 representing one embodiment of a process for analyzing the interactivity of a web resource based on reload events in accordance with the present disclosure is shown. Except where otherwise noted, reference numerals that are preceded by the number "6," as shown in FIG. 6, indicate steps that are similar to steps having reference numerals preceded by the number "3," as shown in FIG. 3.

At step 605, a system that may be operated by or maintained on one or more server-side applications inserts a detection package into code for displaying a web page, and at step 610, a user performs a load event requesting the web page from a browser. For example, a subset of embedded code or scripting events adapted to record the name and version of the browser, the operating system, the location and the time and date of the load event and a reload event at the time that the reload event is initiated may be loaded into an existing set of code for generating a web page by a server or a server-side application, and a user may enter a URL corresponding to the web page into an address bar on a browser. At step 615, and in response to the load event, the browser requests the code for generating the web page from the system, and at step 620, the system transmits the code to the browser. For example, the browser may transmit a call for a web page posted at the location designated by the URL or an IP address associated therewith to the system, and the system may transmit the code for displaying the web page, and any associated content, to the browser.

At step 640, the user makes a first interaction with the web page via the web browser. For example, referring to the web browser 200 shown in FIG. 2, the user may select the hyperlinked image 262 or the hyperlinked set of text 264, or interact with (i.e., select) any of the drop-down menus shown in the menu bar 210, any of the buttons or other features shown in the option bar 220, enter a URL or other file location into the address bar 230, or adjust the portion of the web page 250, using the tools of the slider bar 240. At step 645, the system determines whether the first user interaction includes a reload event. For example, referring again to the web browser 200 shown in FIG. 2, the system may determine whether the user has selected the "refresh" button 226, or performed any other event that will result in the reloading of the web page 250 that is currently displayed by the web browser, such as by selecting a bookmark or hyperlink corresponding to the web page. If the first user interaction does not include a reload event, then the process advances to step 650 and transmits the first user interaction to the system, and the process ends.

If the first user interaction includes a reload event, then the process advances to step 655, where the browser records operational information, as specified by the detection package, and to step 657, where the browser again requests the code for generating the web page from the system. For example, once a reload event has been initiated, the browser may record the name and version of the browser, the operating system, the location and the time and date of the load event and a reload event at the time that the reload event is initiated, and the system may retransmit the code to the browser. At step 670, the browser displays the web page to the user.

At step 672, the user makes a second user interaction with the web page via the browser. For example, referring again to the web browser 200 shown in FIG. 2, the user may select the hyperlinked image 262 or the hyperlinked set of text 264. At step 675, the browser transmits the operational information recorded at step 655 and the second user interaction to the system. For example, in response to the second user interaction, the browser may transmit not only any commands that may be included in the second user interaction, but also the operational data that was recorded at step 655, i.e., any information regarding the browser or the computer on which it operates, or the circumstances associated with the viewing of the web page or the reload event.

At step 690, the system analyzes the operational information received from the browser, as well as any other pertinent operational information captured at the system end, to determine whether any potential issues relating to the web page exist, particularly regarding the second user interaction and the process ends. For example, the system may determine whether there are any operational reasons why the user could not have performed the second user interaction at the time that the reload event was initiated, and take any remedial actions to address any faults identified thereby.

As is discussed above, the systems and methods of the present disclosure may consider operational information captured observed at both the client side (i.e., by a client-side application or a machine on which the application operates) and the server side (i.e., by a server-side application or a server on which the application operates). As is also discussed above, the systems and methods of the present disclosure may further determine whether any operational issues exist with regard to a web resource, and identify a general location where such issues may exist within a DOM associated with the web resource. For example, where a detection script or package is embedded within a set of code for displaying a web page, and includes one or more virtual milestones within the code, the systems and methods of the present disclosure may attempt to pinpoint a particular location within the code and/or the DOM based on a number and location of virtual milestones which were properly loaded by a browser, as compared to a number and location of virtual milestones which were not properly loaded. Such virtual milestones referenced above may take any form.

Referring to FIG. 7A, a set of code 700A for displaying a web page is shown. The set of code includes a subset of code 710A, or detection script, adapted to perform a number of functions during the loading of the web page and/or once the user leaves or refreshes the web page, and a subset of code 730A for rendering the web page on a web browser or other client-side application. For example, elements 711A and 712A cause the client-side application to record any exceptions (i.e., errors occurring within methods) created by the client-side application or exceptional objects (i.e., information regarding such errors) generated by the client-side application, and to capture the current time, at the earliest moment. Elements 713A and 714A defines a client data object or set, and the time at which such data will be captured, and elements 715A, 720A, 721A and 722A define a series of variables relating to the client data object or set, including any saved scripting errors (viz., "JSErrors"), an elapsed time since the initial load event a web page, as calculated using the start time captured at element 712A (viz., "Duration"), a list or record of the number of virtual milestones (viz., "breadcrumbs") that appeared on a web page and a series of operational metrics such as a URL or the dimensions of a web browser.

Element 723A causes the client-side application to collect the variables or information in the client data object or set, and element 724A causes such variables or information to be returned to one or more server-side applications, upon the performance of an event. Element 725A causes a virtual milestone that loaded on the web page to be stored or logged in a registry, and element 726A defines the event that will cause the variables or information in the client data object or set to be collected (viz., the departure from, or reloading of, a web page) and returned to the server-side application at step 724A.

The subset of code 730A includes a variety of tagged elements for displaying a header 732A, a hyperlinked set of text 734A, a list title 736A and an unordered list 738A. The set of code 730A also includes tagged elements for providing virtual milestones 740A on the web page. As is shown in FIG. 7A, the milestones 740A in the set of code 700A include images that are entitled breadcrumbs.jpg and have dimensions of five pixels by five pixels, to be displayed after each of the header, the hyperlinked set of text, the list title and the bulleted list elements on the web page. The images may have any color or may be colorless, and take any shape or form.

Each of the virtual milestones 740A is provided a number in series, and, upon loading on the web page, may be logged in a record or other registry.

Figure 7B:
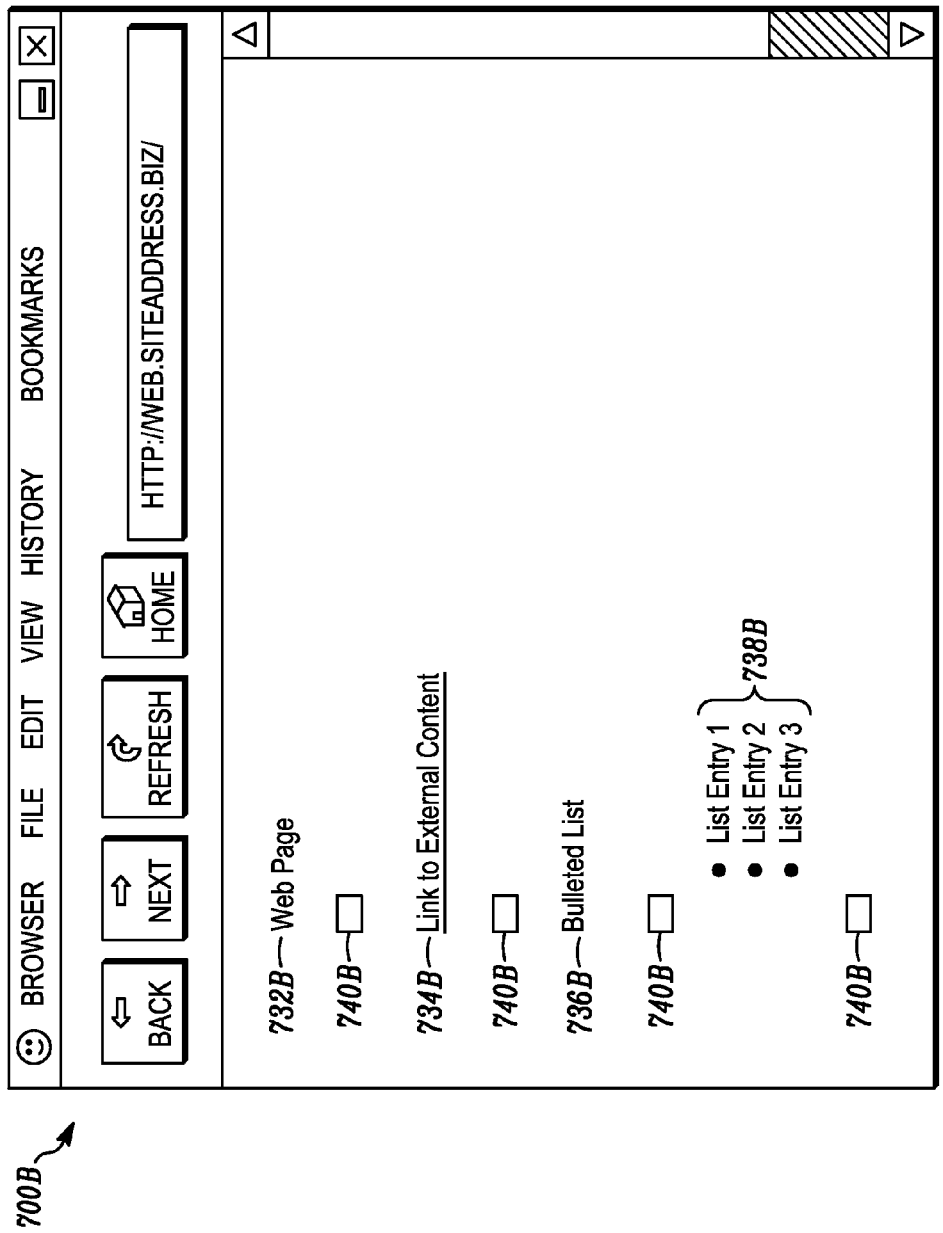
FIG. 7B is a web page generated based on the set of code of FIG. 7A for analysis by one embodiment for analyzing the interactivity of a web resource based on reload events, in accordance with embodiments of the present disclosure.

Referring to FIG. 7B, a web browser 700B displaying the web page generated by the set of code 700A of FIG. 7A is shown. The web page includes a header 732B, a hyperlinked set of text 734B, a list header 736B and an unordered list 738B that are each rendered by the subset of code 730A shown in FIG. 7A. The web page also includes a variety of virtual milestones 740B, expressed after each of the elements 732B, 734B, 736B, 738B shown on the web page, which are also rendered by the subset of code 730A shown in FIG. 7A.

Accordingly, where a user of a client-side application requests a web page including a detection script that records operational information regarding the web page, the client-side application and/or the computer on which the client-side application operates, or the server-side application and/or the server on which the server-side application operates, and ultimately initiates a reload event for the same web page, the systems and methods of the present disclosure may determine the amount and extent of the web page that had been loaded by the client-side application at the time that the reload event was initiated by determining which of the virtual milestones embedded within the code for displaying the web page has been rendered at the time that the reload event was initiated. Such information may be captured during the normal operation of the web page and returned to the server-side application, where the information may be reviewed or otherwise analyzed at the server side on a regular basis, and any tickets, electronic messages and/or other notifications may be generated based on any issues that may be identified therein. Such a review or other analysis of such data at the server side may be performed in accordance with one or more business rules, which may place restrictions or threshold limits on derived variables or metrics such as the number and/or frequency of any reload events received or detected from client-side applications, the number or frequency of any exceptions (i.e., exceptional events) created at or by client-side applications, or the number or frequency of elements or locations within a DOM that fail to load at the client-side application. According to one particular embodiment of the present disclosure, the location and/or type of issue that prompted the user to initiate the reload event may be identified by determining which of the virtual milestones was properly loaded by the client-side application, and which of the virtual milestones failed to load.

As is discussed above, a client-side application that detects a reload event may, in accordance with a detection script embedded within a set of code for displaying a web page, capture any information or data regarding the web page, the client-side application itself, or the computer on which the client-side application operates, or any of the circumstances associated with the viewing of the web page or the reload event. Once a reload event has been detected by the client-side application, such information or data may then be transmitted to one or more applications operating on the server side for analysis.

According to some other embodiments of the present disclosure, the client-side application may persistently capture operational information or data regarding a web page, the client-side application itself, or the computer on which the client-side application operates in accordance with a detection script. The client-side application may then transfer such information or data to a server-side application upon the occurrence of a predefined event, and the server-side application may analyze such information to determine whether a reload event has occurred and/or attempt to identify any causes thereof. In such embodiments, both the detection of a reload event, and the analysis of any factors that may have prompted the reload event, may be conducted on the server side.

Figure 8:
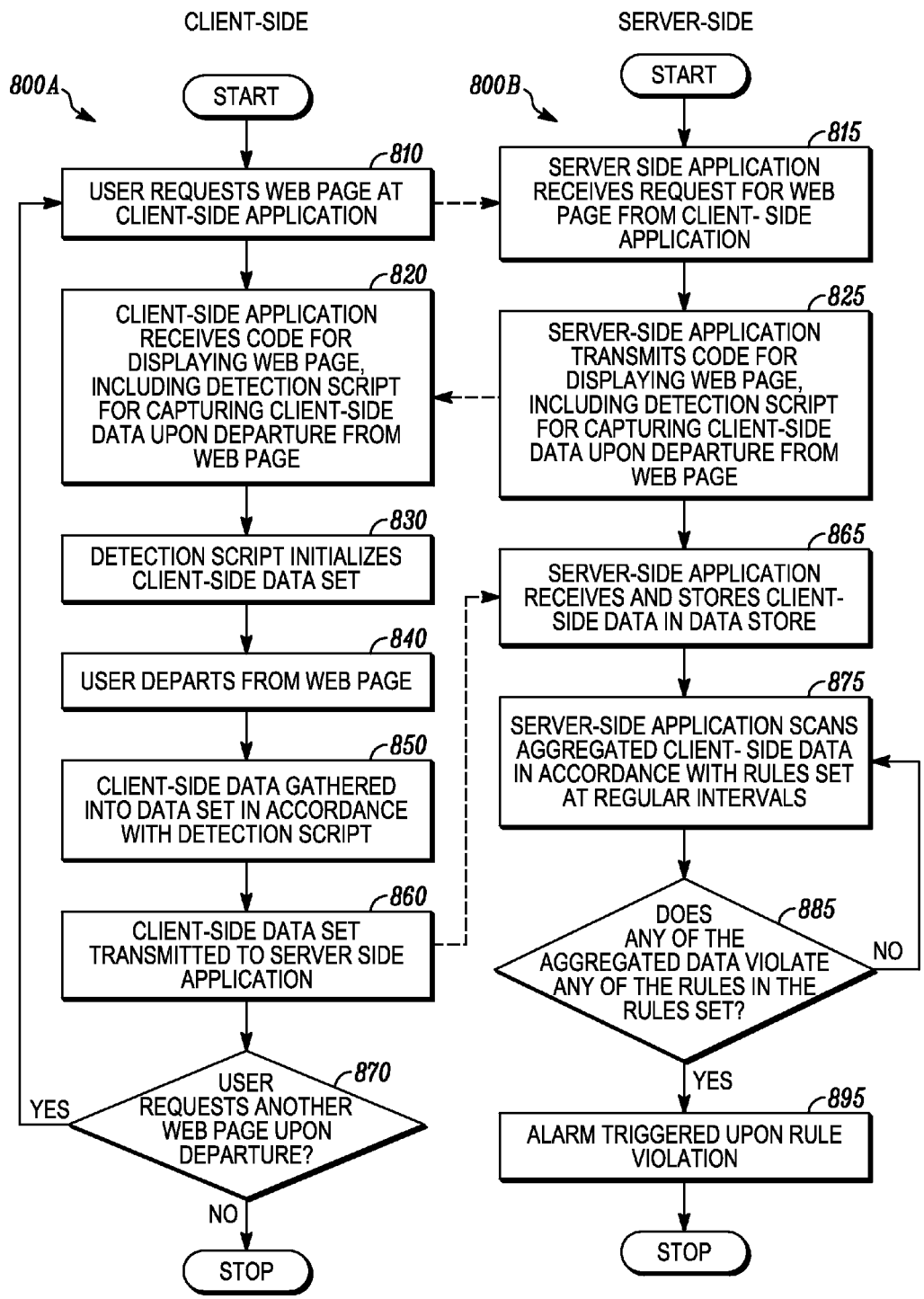
FIG. 8 is a flow chart of a process for analyzing the interactivity of a web resource, in accordance with embodiments of the present disclosure.

Referring to FIG. 8, a pair of flow charts 800A, 800B representing processes for analyzing the interactivity of a web resource that may be performed on a client-side application and a server-side application, respectively, in accordance with one embodiment of the present disclosure is shown. The processes represented in flow charts 800A, 800B may operate independent of one another within the respective applications, and the various points at which the respective applications interact with one another are shown.

Referring to the process represented in flow chart 800A of FIG. 8, at step 810, a user operating a client-side application requests a web page. At step 820, the client-side application receives a set of code for displaying the web page, and the set of code includes a detection script for capturing client-side data upon a departure from the web page (i.e., upon an unload event). For example, the set of code may resemble the set of code 700A shown in FIG. 7A, and may include a detection script resembling the subset of code 710A shown in FIG. 7A that may be programmed to capture and transmit operational information to a server-side application upon a departure from the web page.

Once the client-side application receives the set of code, at step 830, the detection script may initialize a client-side data set, i.e., a set of information that may contain the data captured in accordance with the detection script. Upon the user's departure from the web page at step 840, the client-side application may gather the requisite client-side data into the data set in accordance with the detection script at step 850, and transmit the data set to the server-side application at step 860. For example, when a user of a web browser selects a new web page, closes the client-side application or takes any other step that causes the client-side application to depart the web page, the client-side data may be gathered and transmitted to the server-side application. At step 870, if the user's departure from the web page includes a request for another web page, then the process returns to step 810. If the user's departure does not include a request for another web page, then the process ends.

As is shown in the process represented in the flow chart 800B of FIG. 8, a reciprocal process may be performed on a server-side application that hosts one or more of the web pages requested by a client-side application, such as at step 810 of the process represented in the flow chart 800A of FIG. 8. Referring to the flow chart 800B of FIG. 8, at step 815, a server-side application receives a request for a web page from a client-side application. As is shown in FIG. 8, step 815 may be triggered at step 810 of the process represented in the flow chart 800A. At step 825, the server-side application transmits code for displaying the web page to the client-side application, wherein the set of code includes a detection script that instructs the client-side application to capture client-side information or data upon a departure from the web page, and to transmit such information or data to the server-side application. As is also shown in FIG. 8, step 825 may trigger step 820 of the process represented in the flow chart 800A.

At step 865, the server-side application receives and stores the client-side information or data in one or more data stores. For example, as is shown in FIG. 8, step 865 may be triggered at step 860 of the process represented in the flow chart 800A, and the data set may be received and aggregated with other client-side data. At step 875, the client-side application scans the aggregated client-side data in accordance with a rules set, and at regular intervals. The server-side application may analyze the client-side data independently, or with other client-side data received from the client-side application or from other client-side applications that requested the web page, at predetermined, periodic intervals (e.g., every five minutes), or upon a manual or automatic initiation. Upon reviewing the client-side data, the server-side application may determine whether any of the unload events included a reload event, and analyze the operational information or data received by from the client-side application upon the occurrence of the reload event, to determine whether any operational faults or errors may have prompted the reload event, and may be plaguing the server-side application in particular or the server side in general.

For example, the rules set may include a "high refresh rate" rule, in which the client-side data is analyzed to determine whether reload events, or "refreshes," are occurring at a rate that exceeds a predetermined threshold. Another rule in the rules set may compare a date or time at which a web page is requested versus a date or time at which the reload event was received, to determine whether a problem in loading one or more aspects of the web page, or the entire web page itself, may exist on either the client side or the server side. Still yet another rule may identify the extent of the web page that was successfully loaded upon the occurrence of a reload event, such as by determining the number of virtual milestones, or the specific virtual milestones, that may have been loaded by the client-side application at the time of the reload event. Any type of rule may be utilized by the server-side application to determine whether a reload event occurred and whether any aspect of the client side or the server side may have been a cause of any such reload events.

At step 885, if any of the client-side data that is recorded or aggregated in the data store indicates that one or more of the rules in the rules set has been violated, then the process advances to step 895, where one or more alarms may be triggered. If no such rule violation is indicated, then the process returns to step 875, where the contents of the data store may be scanned and analyzed at one or more regular intervals in the future.

The systems and methods of the present disclosure may also be adapted to persistently provide detection scripts or packages and other monitoring means with or as a part of one or more web resources, and to analyze users' interactions with such resources to determine whether any issues or inconsistencies are present with regard to the resources, or the hardware or software on which the resources are maintained in response to a reload event. If any such issues or inconsistencies are identified, one or more alarms or other indications may be triggered, and the issues or inconsistencies may be manually or automatically analyzed. If no such issues or inconsistencies are identified, the reload event may be ignored or otherwise treated as if the reload event is not indicative of any inadequacy or deficiency associated with the interactivity of the resources, any devices that may have requested the resources, or any servers that may maintain or provide the resources.

Figure 9:
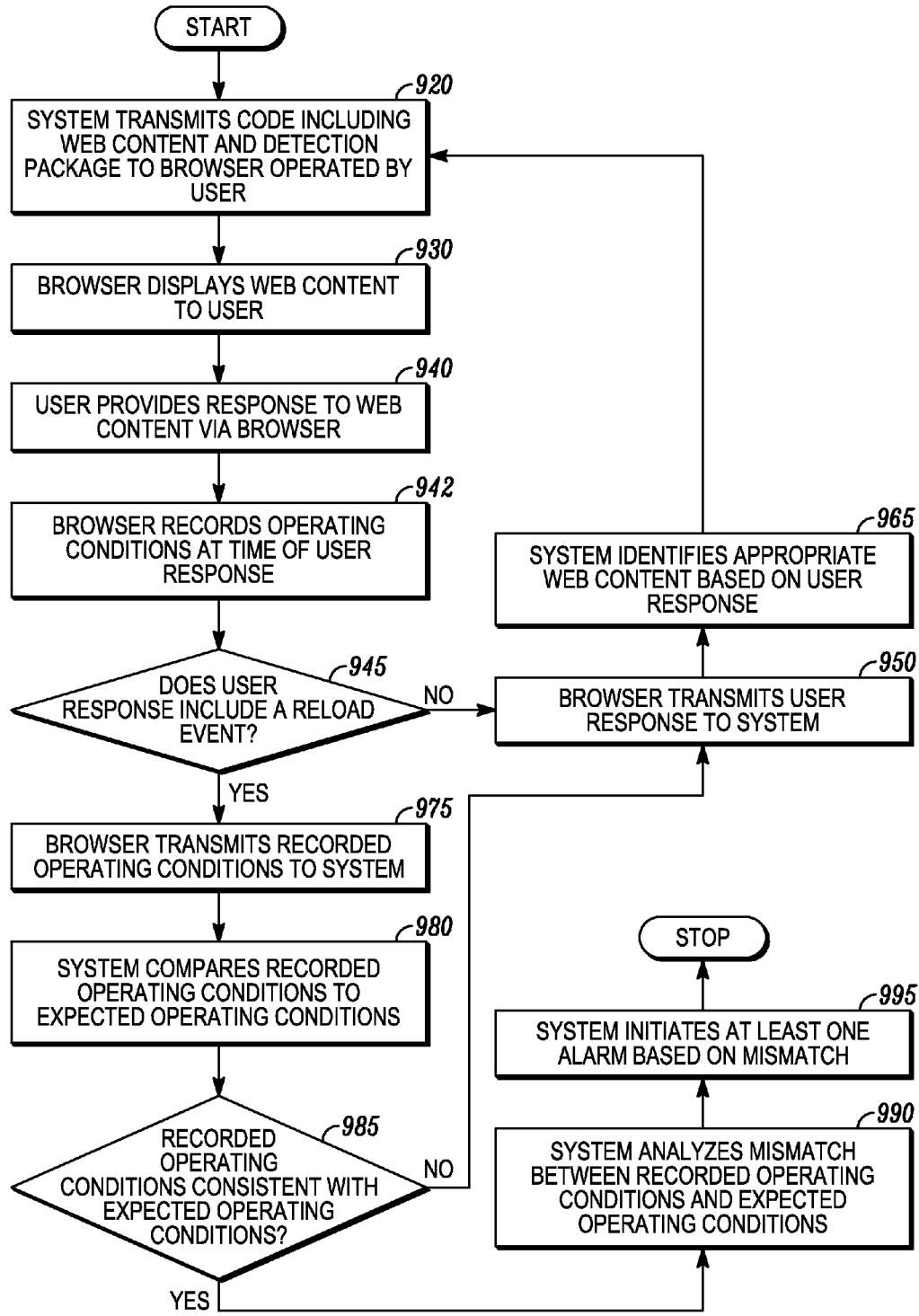
FIG. 9 is a flow chart of a process for analyzing the interactivity of a web resource based on reload events, in accordance with embodiments of the present disclosure.

Referring to FIG. 9, a flow chart 900 representing one embodiment of a process for analyzing the interactivity of a web resource based on reload events in accordance with the present disclosure is shown. Except where otherwise noted, reference numerals that are preceded by the number "9," as shown in FIG. 9, indicate steps that are similar to steps having reference numerals preceded by the number "6," as shown in FIG. 6, or similar to steps having reference numerals preceded by the number "3," as shown in FIG. 3.

At step 920, a system transmits code including web content and a detection package to a browser operated by a user. For example, the system may transmit code for presenting a web page on a browser running on a mobile phone, tablet computer, laptop computer or any other Internet-enabled device, and the code may have embedded therein one or more elements or objects for detecting information associated with the browser or the device, or any actions taken thereon in response to the web. At step 930, the browser may display the web content to the user.

At step 940, the user provides a response to the web content via the browser. For example, the user may select or otherwise interact with any information displayed on or with the web content (e.g., buttons, boxes or hyperlinks). At step 942, the browser records the operating conditions of the browser and/or the device on which the browser operates at the time of the user's response. For example, where a user selects a link or button on the browser, the detection package may record any operational data regarding the web page (e.g., the amount and extent of the information described in the code that successfully thereon), the browser (e.g., the type and version of the browser, as well as the viewing history) and the computer (e.g., any operational information regarding the computer or any associated components).

At step 945, the browser determines whether the user response includes a reload event, such as the selection of a "refresh" or "reload" button, or the selection of a set of text or object hyperlinked to a URL associated with the web content. If the user response does not include a reload event, then the process advances to step 950, where the browser transmits the user response to the system, and to step 965, where the system identifies appropriate web content based on the user response, before returning to step 920.

If the user response includes a reload event, then the process advances to step 975, where the browser transmits the recorded operating conditions to the system, and to step 980, where the system compares the recorded operating conditions to the operating conditions that were expected at the time of the user response. For example, the system may compare the extent of the web content that was fully loaded by the browser versus the extent of the web content that should have been fully loaded by the web browser at the time that the user response was provided, to determine whether any loading errors may exist.

At step 985, if the operating conditions that were recorded at step 942 were consistent with the expected operating conditions, then it may be understood that the reload event was either an inadvertent act by the user, or not indicative of any operational issue or deficiency with regard to the web content, the browser or the system. Accordingly, the process then advances to step 850, where the browser transmits the user response to the system, and to step 865, where the system identifies appropriate web content based on the user response.

If the operating conditions that were recorded at step 942 were inconsistent with the operating conditions that were expected at the time, then it may be understood that some form of issue or deficiency with regard to the web content, the browser or the system. Therefore, the process advances to step 990, where the system analyzes the mismatch between the recorded operating conditions and the expected operating conditions, and to step 995, where the system initiates at least one alarm (e.g., the transmission of one or more messages) based on the mismatch.

Accordingly, by comparing the observed operating conditions of a web resource, a client-side application requesting the web resource and/or a server-side application providing the web resource, such as is shown in the flow chart 900 of FIG. 9, it may be determined whether a reload event is indicative of a greater problem with respect to the web resource or either of the applications, or is simply a normal, intended act by the user.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIGS. 3, 6 and 8, the order in which the steps of the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-implemented method for determining a level of interactivity of a web resource comprising:
    transmitting, from at least one server, a set of code for generating a web resource to a client-side application over a network, wherein the set of code comprises a detection script for capturing operational information regarding at least one of the web resource, the client-side application or the at least one server following a reload event for the web resource, and wherein the detection script comprises instructions for:
    generating a client data object; adding information regarding at least one exception to the client data object;
    adding information regarding an elapsed time between the transmission of the set of code and a detection of the reload event to the client data object;
    adding information regarding generation of at least one virtual milestone by the client-side application;
    adding information regarding the client-side application to the client data object; and
    transmitting the client data object to the at least one server upon the detection of the reload event;
    detecting, at the at least one server, the reload event for the web resource at the client-side application over the network;
    identifying, at the at least one server, the operational information captured from the client-side application in compliance with the detection script over the network; and
    analyzing the operational information to determine the level of interactivity of the web resource using the at least one computer processor;
    wherein the set of code for generating the web resource further comprises an instruction for generating the at least one virtual milestone within the web resource.

2. The computer-implemented method of claim 1, further comprising:
    detecting, at the at least one server, a load event for the web resource from the client-side application over the network.

3. The computer-implemented method of claim 2, wherein the reload event comprises at least one of:
    a selection of a refresh button at the client-side application,
    a selection of a reload button at the client-side application,
    a selection of a hyperlinked icon at the client-side application,
    a selection of a hyperlinked set of text at the client-side application,
    a selection of a bookmark at the client-side application, or
    a shutdown of the client-side application, a restart of the client-side application and a request for the set of code for generating the web resource from the client-side application.

4. The computer-implemented method of claim 2, wherein the operational information includes at least one of:
    a Uniform Resource Locator for the web resource,
    an elapsed time between an initiation of the load event for the web resource and an initiation of the reload event for the web resource,
    at least one exception object generated by the client-side application in response to an exception,
    a type of the client-side application from which the reload event was initiated,
    a number of virtual milestones loaded by the client-side application,
    a version of a set of operating software maintained on a computer operating the client-side application upon the initiation of the reload event, or
    a location of the computer upon the initiation of the reload event.

5. The computer-implemented method of claim 4, further comprising:
    storing the operational information captured from the client-side application in compliance with the detection script in a data store associated with the at least one server,
    wherein the data store further includes operational information regarding at least one of the web resource, other client-side applications or the at least one server captured from a plurality of other client-side applications following previous reload events for the web resource in compliance with the detection script.

6. The computer-implemented method of claim 1, wherein identifying the operational information comprises:
    receiving the operational information from the client-side application over the network.

7. The computer-implemented method of claim 1, wherein identifying the operational information comprises:
    capturing, at the at least one server, the operational information using the at least one computer processor.

8. The computer-implemented method of claim 1, further comprising:
generating, using the at least one computer processor, the set of code for generating the web resource;
inserting, at the at least one server, the detection script into the set of code for generating the web resource using the at least one computer processor,
wherein the detection script is programmed in JavaScript®.

9. The computer-implemented method of claim 1, further comprising:
identifying, at the at least one server, a plurality of business rules;
analyzing, at the at least one server, the client data object to determine whether any of the business rules is violated.

10. The computer-implemented method of claim 9, wherein the business rules comprise at least one of a threshold number of reload events, a threshold number of exceptions or a threshold number of virtual milestones.

11. The computer-implemented method of claim 1, further comprising:
transmitting, from the at least one server, the set of code for generating the web resource to the client-side application over the network in response to the reload event.

12. The computer-implemented method of claim 1, wherein the detection script is further adapted to cause the client-side application to store the operational information in a database.

13. The computer-implemented method of claim 1, further comprising:
receiving, at the at least one server, information regarding a user interaction with the web resource following the reload event,
wherein analyzing the operational information to determine the level of interactivity of the web resource comprises identifying a portion of the set of code associated with the user interaction with the web resource following the reload event.

14. The computer-implemented method of claim 1, further comprising:
identifying an expected operational status of at least one of the web resource, the client-side application or the at least one server,
wherein analyzing the operational information to determine the level of interactivity of the web resource comprises comparing the operational information to the expected operational status.

15. The computer-implemented method of claim 14, further comprising:
determining that the operational information is consistent with the expected operational status; and
determining the level of interactivity of the web resource to be sufficient based at least in part on the operational information.

16. The computer-implemented method of claim 14, further comprising:
determining that the operational information is not consistent with the expected operational status; and
transmitting at least one alarm based at least in part on the operational information.

17. The computer-implemented method of claim 1, wherein the operational information includes information regarding a portion of the web resource loaded by the client-side application upon an initiation of the reload event, and
wherein analyzing the operational information to determine the level of interactivity of the web resource comprises:
identifying a portion of the set of code corresponding to the portion of the web resource loaded by the client-side application upon the initiation of the reload event.

18. A computer-implemented method for determining a level of interactivity of a web resource comprising:
detecting, at at least one server, a load event for the web resource from a client-side application over the network;
transmitting, from the at least one server, a set of code for generating the web resource to a client-side application over a network, wherein the set of code comprises a detection script for capturing operational information regarding at least one of the web resource, the client-side application or the at least one server following a reload event for the web resource;
detecting, at the at least one server, the reload event for the web resource at the client-side application over the network;
identifying, at the at least one server, the operational information captured from the client-side application in compliance with the detection script over the network; and
analyzing the operational information to determine the level of interactivity of the web resource using the at least one computer processor, wherein analyzing the operational information to determine the level of interactivity of the web resource comprises comparing a time and a date of an initiation of the reload event to a time and a date of at least one of previous reload events; and
storing at least some of the operational information captured from the client-side application in compliance with the detection script in a data store associated with the at least one server, wherein the data store further includes operational information regarding at least one of the web resource, other client-side applications or the at least one server captured from a plurality of other client-side applications following the previous reload events for the web resource in compliance with the detection script, wherein the operational information captured from the client-side application in compliance with the detection script includes at least one of:
a Uniform Resource Locator for the web resource,
an elapsed time between an initiation of the load event for the web resource and the initiation of the reload event for the web resource,
at least one exception object generated by the client-side application in response to an exception,
a type of the client-side application from which the reload event was initiated,
a number of virtual milestones loaded by the client-side application,
a version of a set of operating software maintained on a computer operating the client-side application upon the initiation of the reload event, or
a location of the computer upon the initiation of the reload event.

19. The computer-implemented method of claim 18, wherein analyzing the operational information to determine the level of interactivity of the web resource further comprises:
determining a threshold frequency of reload events for the web resource based on the operational information included in the data store, and
transmitting at least one alarm if the reload event exceeds the threshold frequency.

20. The computer-implemented method of claim 18, wherein analyzing the operational information to determine the level of interactivity of the web resource further comprises:
- determining a threshold elapsed time for reload events of the web resource, and
- transmitting at least one alarm if the elapsed time exceeds the threshold elapsed time.

21. The computer-implemented method of claim 18, further comprising:
- identifying a user of the client-side application that initiated the reload event for the web resource;
- identifying an elapsed time threshold for reload events initiated by the user;
- determining that the elapsed time exceeds the elapsed time threshold; and
- determining the level of interactivity of the web resource to be sufficient based at least in part on the elapsed time.

22. The computer-implemented method of claim 18, further comprising:
- identifying a user of the client-side application that initiated the reload event for the web resource;
- identifying an elapsed time threshold for reload events initiated by the user;
- determining that the elapsed time does not exceed the elapsed time threshold; and
- generating at least one alarm based at least in part on the elapsed time.

23. A computer-implemented method for determining a level of interactivity of a web resource comprising:
- detecting, at at least one server, a load event for the web resource from a client-side application over the network;
- transmitting, from the at least one server, a set of code for generating the web resource to a client-side application over a network, wherein the set of code comprises a detection script for capturing operational information regarding at least one of the web resource, the client-side application or the at least one server following a reload event for the web resource;
- detecting, at the at least one server, the reload event for the web resource at the client-side application over the network;
- identifying, at the at least one server, the operational information captured from the client-side application in compliance with the detection script over the network; and
- analyzing the operational information to determine the level of interactivity of the web resource using the at least one computer processor, wherein analyzing the operational information to determine the level of interactivity of the web resource comprises comparing a location of the computer upon initiation of the reload event to a location of at least one of previous reload events; and
- storing at least some of the operational information captured from the client-side application in compliance with the detection script in a data store associated with the at least one server, wherein the data store further includes operational information regarding at least one of the web resource, other client-side applications or the at least one server captured from a plurality of other client-side applications following the previous reload events for the web resource in compliance with the detection script, wherein the operational information captured from the client-side application in compliance with the detection script includes at least one of:
  - a Uniform Resource Locator for the web resource,
  - an elapsed time between an initiation of the load event for the web resource and the initiation of the reload event for the web resource,
  - at least one exception object generated by the client-side application in response to an exception,
  - a type of the client-side application from which the reload event was initiated,
  - a number of virtual milestones loaded by the client-side application,
  - a version of a set of operating software maintained on a computer operating the client-side application upon the initiation of the reload event, or
  - the location of the computer upon the initiation of the reload event.

* * * * *